(12) United States Patent
Rothman et al.

(10) Patent No.: US 7,506,149 B2
(45) Date of Patent: Mar. 17, 2009

(54) METHOD, PROGRAM AND SYSTEM TO UPDATE FILES IN A COMPUTER SYSTEM

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 10/927,834

(22) Filed: Aug. 27, 2004

(65) Prior Publication Data
US 2006/0047942 A1    Mar. 2, 2006

(51) Int. Cl.
*G06F 9/00* (2006.01)
(52) U.S. Cl. ................... 713/2; 713/1; 713/100
(58) Field of Classification Search ............ 713/1, 713/2, 100
See application file for complete search history.

(56) References Cited

U.S. PATENT DOCUMENTS

| | | | | |
|---|---|---|---|---|
| 5,537,531 A | * | 7/1996 | Suga et al. ................ | 345/543 |
| 6,516,346 B1 | * | 2/2003 | Asco et al. ................ | 709/221 |
| 6,640,334 B1 | * | 10/2003 | Rasmussen ................ | 717/171 |
| 6,934,857 B1 | * | 8/2005 | Bartleson et al. ........... | 726/5 |
| 6,986,133 B2 | * | 1/2006 | O'Brien et al. ............ | 717/173 |
| 7,032,213 B1 | * | 4/2006 | Lupu et al. ................ | 717/129 |
| 7,055,148 B2 | * | 5/2006 | Marsh et al. .............. | 717/172 |
| 7,233,975 B1 | * | 6/2007 | Gerraty et al. ............ | 709/213 |
| 2003/0172372 A1 | * | 9/2003 | Crisan et al. ............. | 717/170 |

* cited by examiner

*Primary Examiner*—Abdelmoniem Elamin
(74) *Attorney, Agent, or Firm*—Konrad Raynes & Victor LLP; David W. Victor

(57) ABSTRACT

Provided is a method, program and system to update files in a computer system. A boot sequence is executed in the computer system to query a server over a network before loading an operating system to determine whether there is a patch to apply. The patch is received from the server in response to the query and the program files are updated with contents of the patch. The operating system is loaded in response to updating the program files.

17 Claims, 4 Drawing Sheets

US 7,506,149 B2

METHOD, PROGRAM AND SYSTEM TO UPDATE FILES IN A COMPUTER SYSTEM

BACKGROUND

System users connected to a network may receive notifications of a patch update for their installed software. For instance, a network administrator may send notification to user systems in a corporate network of patches to apply. Notwithstanding such notification, the users may decide not to install the patches, thus running older versions of the installed programs. Users that do not have the current version of software may experience errors and other problems that require assistance by the network administrators. Moreover, if users delay upgrading anti-virus signatures, then they may not be protected from the most recent viruses which could expose them and the entire network to which they are connected to a virus attack. Once a system is disabled by a virus, the virus could prevent the user system from communicating with the network and loading the patches and fixes needed to detect and eliminate the virus. Still further, because users may not apply the patches and upgrades, network administrators must spend time monitoring whether users have applied patches to ensure that that systems have the most recent fixes, patches and updates installed.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
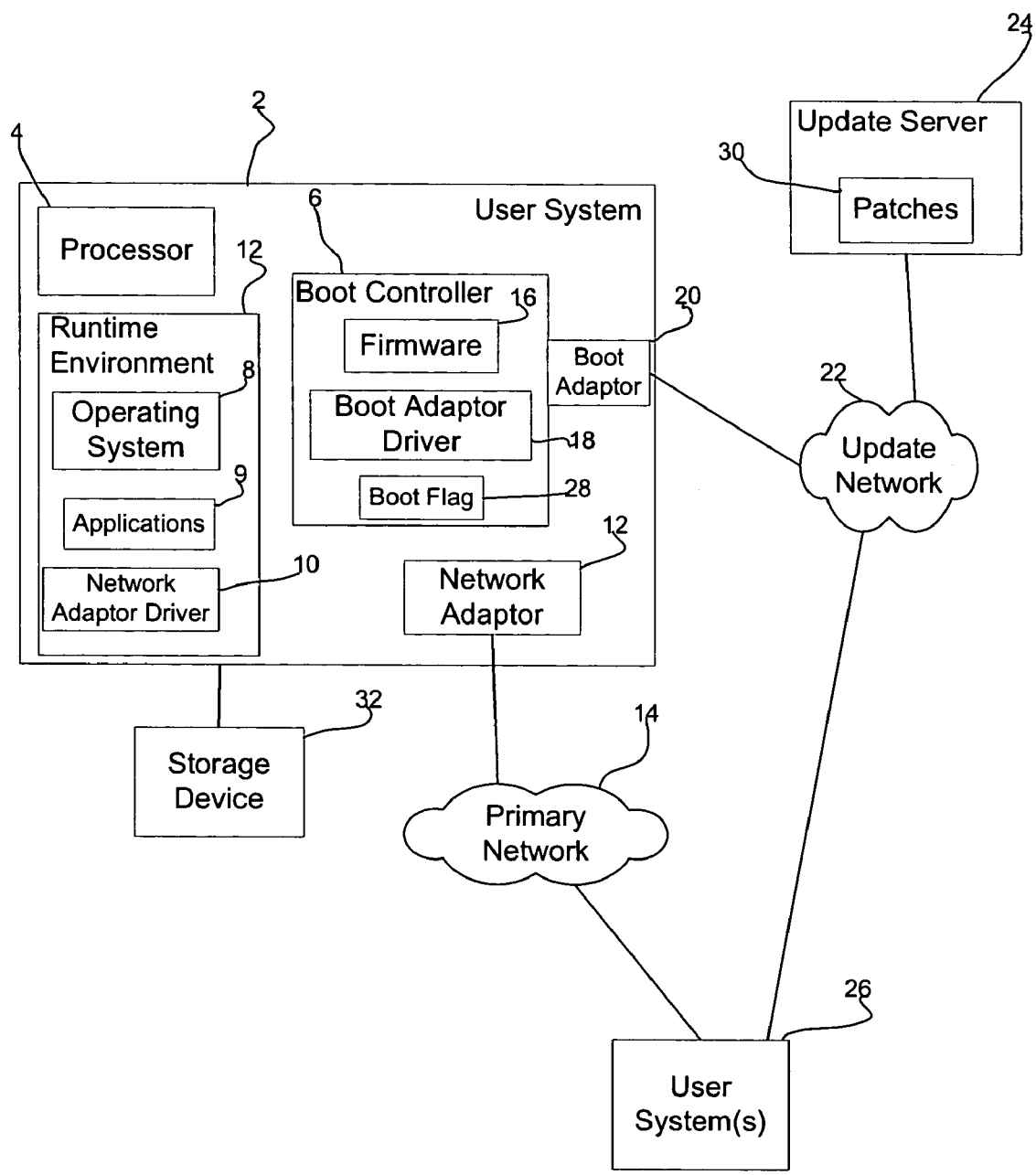
FIG. 1 illustrates an embodiment of a network computing environment.

FIG. 1 illustrates a computing environment used with the described embodiments. A user system 2 includes a processor 4 and boot controller 6 which loads an operating system 8, application programs 9, and device drivers, e.g., network adaptor driver 10, etc., into a runtime environment 12. The network adaptor driver 10 enables the user system 2 to use a network adaptor 12 to communicate with a primary network 14, such as a local area network (LAN), Wide Area Network (WAN), Storage Area Network (SAN), Intranet, Internet, wireless network, etc.

The boot controller 6 may be implemented in firmware in a Basic Input Output System (BIOS) device on the user system 2 motherboard. The boot controller 6 includes firmware 16 and a boot adaptor driver 18 that enables the boot controller 6 to use a boot adaptor 20 to communicate on an update network 22. The boot adaptor 20 enables the boot controller 6 to communicate with an update server 24 over the update network 22, where the update server supplies patches, fixes and other updates to user systems 26, which include a similar configuration to user system 2, over the update network 22. The boot controller 6 may use the boot adaptor driver 18 and boot adaptor 20 to communicate with the update server 24 over the update network 22 before the operating system 8 and other programs, such as network adaptor driver 10, are loaded into the runtime environment 12. In this way, the boot adaptor 20 enables communication with an out-of-band network, e.g., update network 22, for accessing patches and the network adaptor 12 enables communication with the in-band network, e.g., the primary network 14, the user primarily uses for communication.

A boot flag 28 indicates whether the boot controller 6 may continue executing the boot sequence to load the operating system 8 and other applications 9. For instance, the boot controller 6 may clear the boot flag 28 after all patches 30 downloaded from the update server 24 are applied. After the boot flag 28 is cleared, the boot controller 6 continues the loading of the operating system 8 and other programs and completes initialization. Patches 30 comprises an update, upgrade or fix to be applied to the operating system 8, drivers, e.g., 10, firmware 16, and installed applications loaded by the boot sequence or invoked by the user following the boot sequence and initialization, etc.

The boot adaptor driver 18 and boot flag 28 may be implemented in the boot controller 6 firmware 16, such as within a flash memory device or BIOS device. Alternatively, the boot controller 6 may load the boot adaptor driver 18 and boot flag 28 from a storage device 32, which may comprise a primary system storage of the user system 2. The operating system 8 and application programs are loaded into the runtime environment 12 from the storage device 32. In certain embodiments, the boot controller 6 may implement the Extensible Firmware Interface (EFI) specification, which defines an interface between the operating system 8 and the boot services 6 firmware. The EFI interface provides data tables that contain platform-related information, boot and runtime service calls that are available to the boot controller 6 operating system 8 loader, and a standard environment for booting the operating system 8. EFI is further defined in the publication "Extensible Firmware Interface Specification", Version 1.10 (Copyright Intel Corp., 1998-2002).

The operating system 8 may comprise an operating system known in the art, such as a Microsoft® Windows® operating system, Linux™, etc. (Microsoft and Windows are registered trademarks of Microsoft Corporation and Linux is a trademark of Linus Torvalds). The applications 9 may comprise programs loaded by the boot controller 6 or invoked by the user during runtime. The storage device 32 may comprise a hard disk drive or other device from which the operating system 8, drivers, e.g., 10, and installed program files and objects may be loaded.

Figure 2:
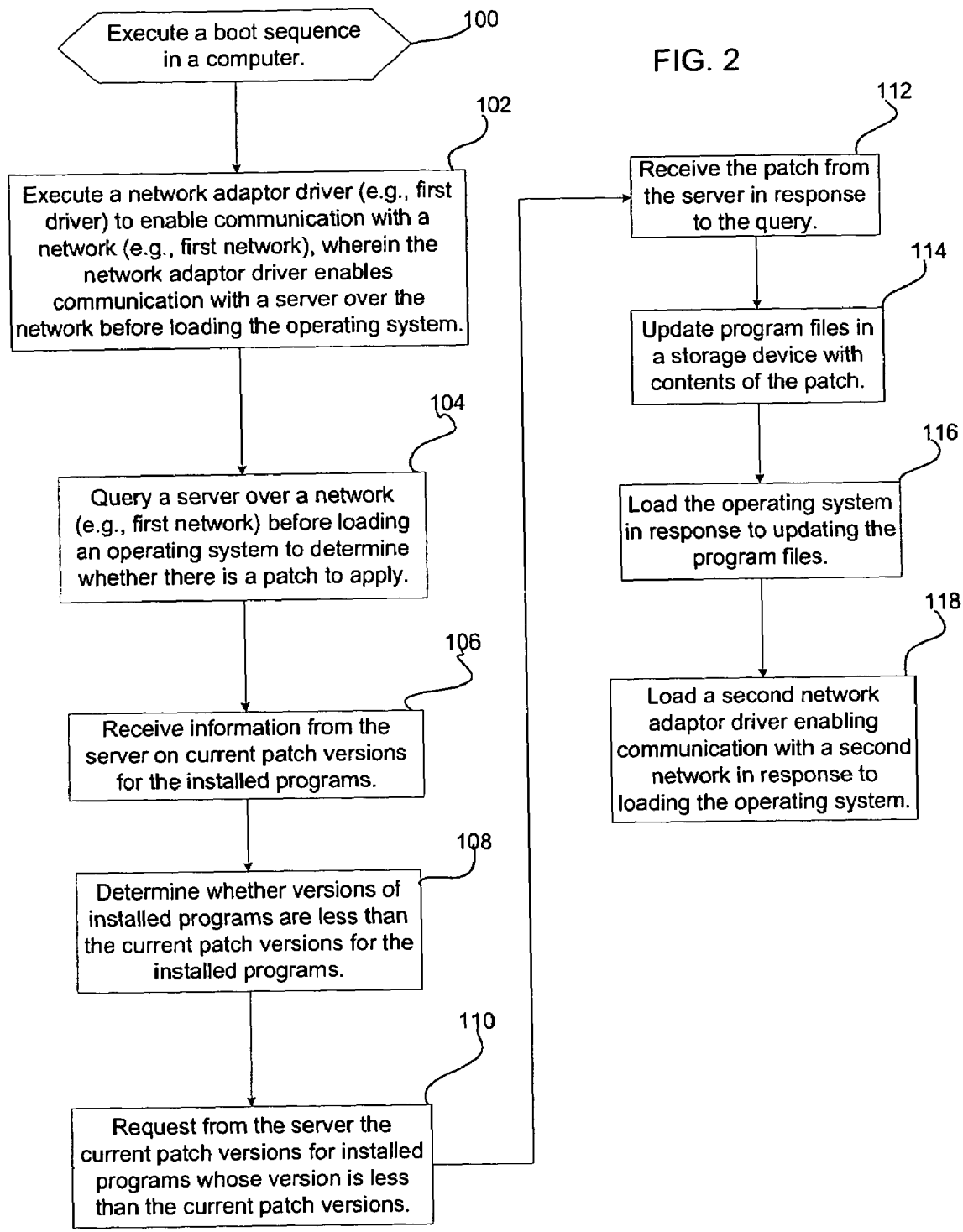
FIGS. 2, 3, and 4 illustrate an embodiment of operations to access and install patches.

FIG. 2 illustrates operations performed by the boot controller 6 executing the firmware 16. When executing (at block 100) the boot sequence, the boot controller 6 executes (at block 102) a network adaptor driver, e.g., the boot adaptor driver 18, to enable communication with a network, e.g., the update network 22. The network adaptor driver, e.g., boot adaptor driver 18, enables communication with the update server 24 over the update network 22 before loading the operating system 8. The boot controller 6 may query (at block 104) the server, e.g., update server 24, over the update network 22 to determine whether there are one or more patches 30 to apply before loading the operating system 8. In response to the query, the boot controller 6 may receive (at block 106) information from the update server 24 on current patch versions 30 for the installed programs. A determination is then made (at block 108) of whether versions of installed programs, e.g., the operating system 8, applications 9, drivers, etc., are less than the current patch versions for the installed programs. At this point, the installed programs, including the operating system 8, applications 9, and any drivers stored in the storage device 32, have not yet been loaded into the runtime environment 12. The determination of the version of installed programs may be made by processing a registry file or other object indicating version information for all installed programs in the user system 2, including those invoked during the boot sequence or runtime.

The boot controller 6 may then request (at block 110) from the update server 24 the current patch versions 30 for installed programs whose version is less than the current patch versions. The boot controller 6 may request any patch versions beyond the current installed patch version to install in sequential order from the earliest patch version to the latest. Upon receiving (at block 112) the one or more patches 30 from the update server 24 in response to the query, the boot controller 6 updates (at block 114) the program files (e.g., operating system, device drivers, applications, etc.) in the storage device 32 with contents of the downloaded one or more patches 30.

After applying the downloaded patches 30, the boot controller 6 loads (at block 116) the operating system 8 and a second network adaptor, such as network adaptor driver 10, to enable communication with a second network, e.g., primary network 14, as part of loading programs into the runtime environment, e.g., the operating system 8, applications, etc. Any other drivers and applications 9 loaded during the boot sequence, as opposed to those selectively invoked by the user during runtime, are also loaded by the boot controller 6.

With the described embodiments, patches 30 containing new code are applied before the operating system 8 and other programs are loaded into the runtime environment 12. For instance, if the user system 2 has become infected with a virus that disables the primary network adaptor driver 10, or network stack, the boot controller 6 upon rebooting would download and apply virus signature files and any updates to the virus scanner program, so that when the virus program is loaded during the boot sequence, any new viruses may then be detected and quarantined. Moreover, with the described embodiments, new patches are automatically installed by the boot controller 6 without user involvement so that the user system 2 programs have the most recent versions deployed throughout the network. Further, by providing an additional boot adaptor 20 (e.g., out-of-band network) for the boot controller 6 to use, patches may be applied even if the user system 2 network adaptor driver 10 is disabled or otherwise corrupted.

In certain embodiments, the primary network 14 may comprise a corporate or enterprise network, where network administrators test and verify patches 30 before making the patches available on the update server 30. The network administrators may then be assured that user systems' 2 boot controllers 6 will automatically update the verified and approved patches 30 to maintain consistent platform levels at the user systems 26 throughout the enterprise.

Figure 3:
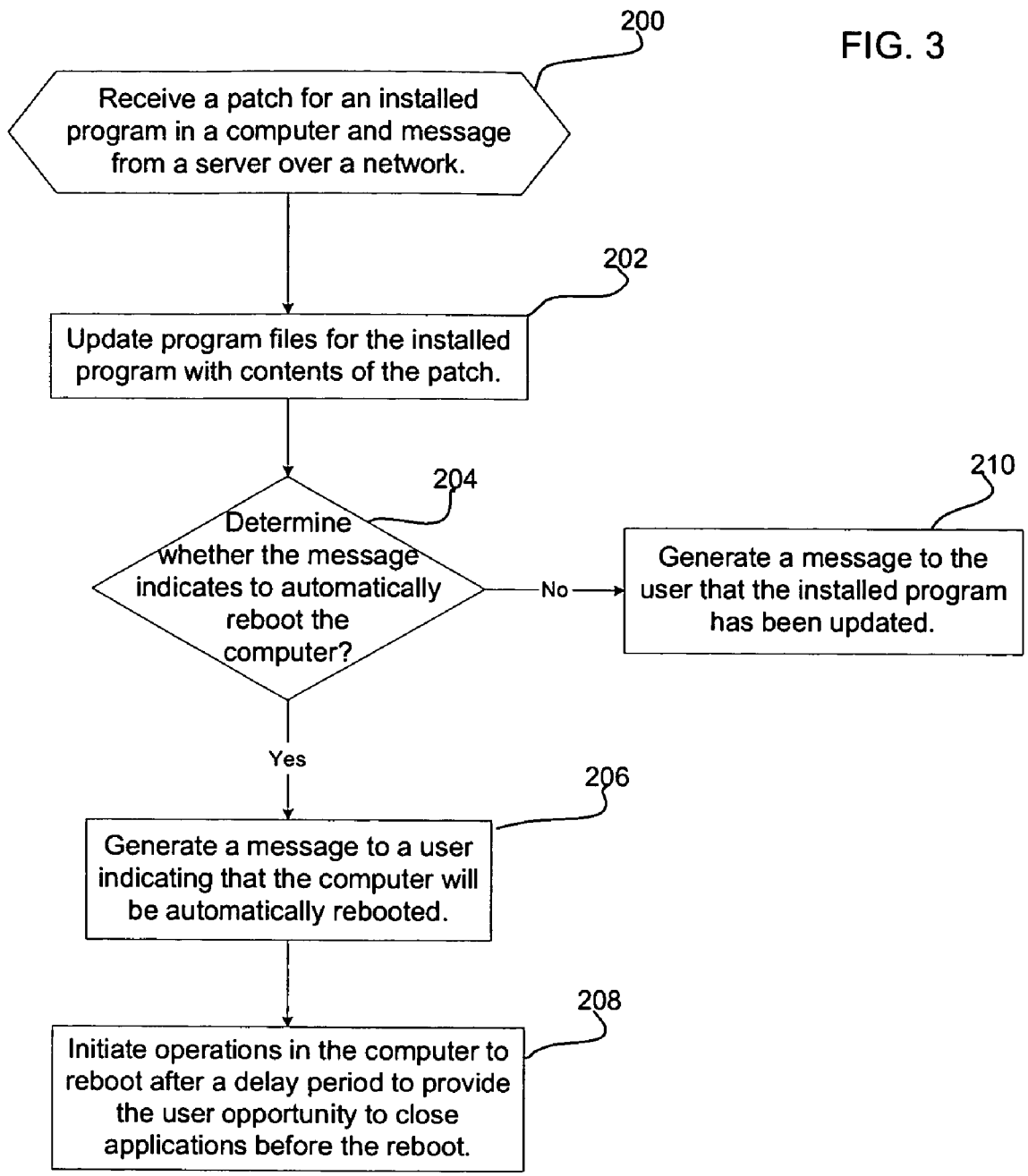

FIG. 3 illustrates operations performed in the user system 2 to apply new patches 30 from the update server 24 after the boot sequence completes and the operating system 8 and other programs are loaded into the runtime environment 12. A patch 30 for an installed program in the user system 20 and message from a server are received (at block 200) over a network. In certain embodiments, the patch 30 may be received by the boot controller 6 over the update network 22. In alternative embodiments, the patch 30 may be received by the primary network 14 and installed by an application program, e.g., one of application programs 9 comprising an installation program. The program files for the installed program are updated (at block 202) with the contents of the patch 30. In certain embodiments, the boot controller 6 may apply the update or make a call to the operating system 8 to apply the patch 30. The boot controller 6 or other application handling the application of the patch determines (at block 204) whether the message provided with the patch 30 indicates to automatically reboot the receiving user system 2, such as the case with certain system programs that are currently being accessed and can only be updated upon reboot. This message may be provided in the same or different packets including the patch 30. If (at block 204) the message indicates to automatically reboot, then a message is generated (at block 206) to a user at the user system, via display, sound, etc., indicating that the computer, e.g., 2, will automatically reboot. The reboot may occur after a delay time which begins after the user initiates an input action via the mouse, keyboard, etc. Other alternative techniques may be used to provide the user adequate time to save and orderly exit programs before the reboot occurs. For instance, a dialog box may be continually displayed interfering with user action, but allowing files to be saved and programs closed, until the user reboots. After this delay period, the user system 2 is rebooted (at block 208). If (at block 204) the message provided with the patch 30 does not indicate to automatically reboot, then a message is generated (at block 210) to the user that the installed program has been updated.

The operations to reboot and generate messages to the user may be performed by the boot controller 6 in response to receiving a patch 30 and message on the out-of-band update network 22. Alternatively, the patch 30 and message may be received on the in-band primary network 14 and the operations are performed by an application program 9 executing during normal user system 2 operations after the boot initialization.

Figure 4:
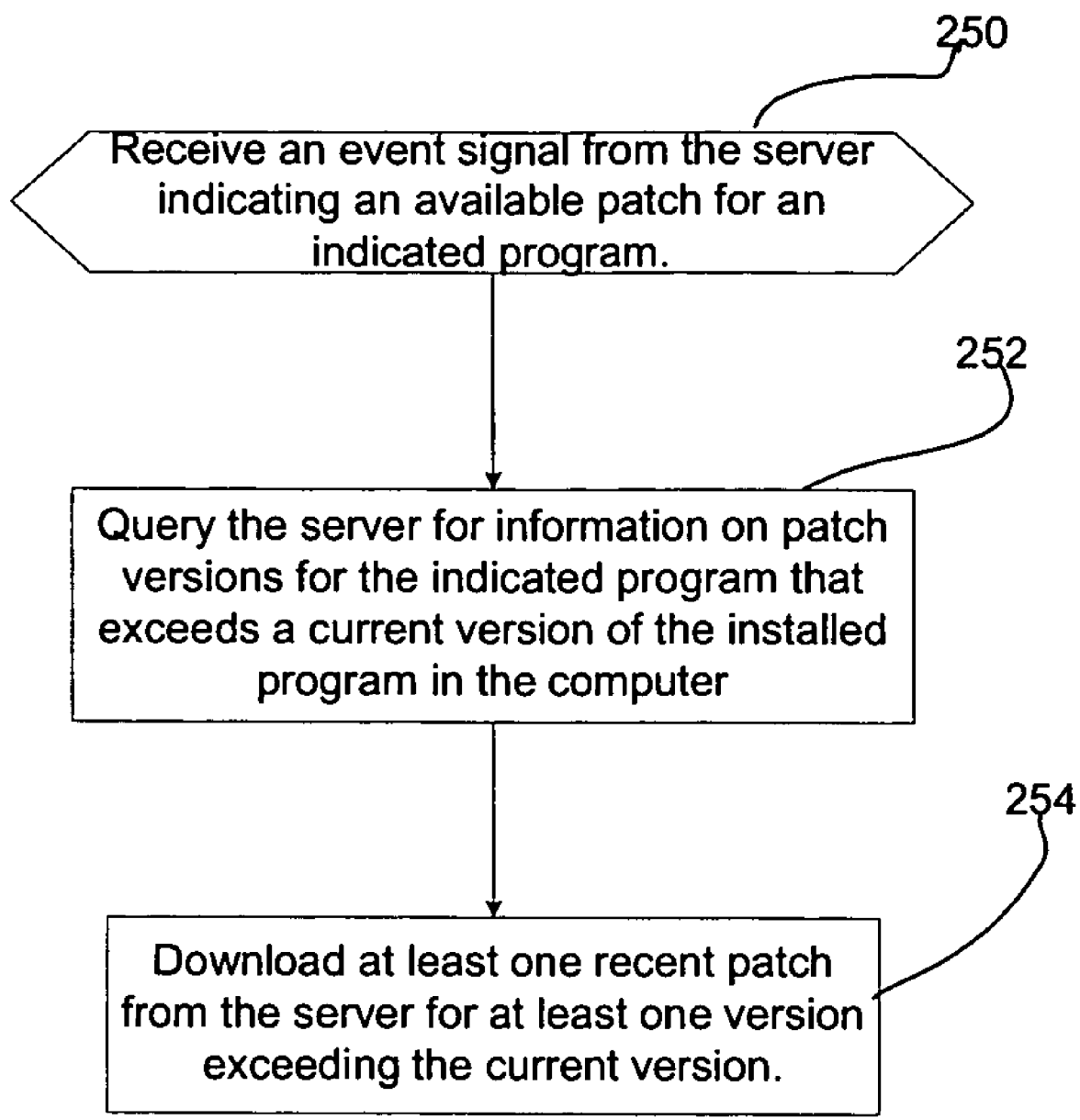

FIG. 4 illustrates additional operations performed when a patch 30 is received during normal user system 2 operations after initialization. In response to receiving (at block 250) an event signal from the server, e.g., update server 24, indicating a patch is available 30 for an indicated program, the update server 24 may be queried (at block 252) for information on the patch 30 versions for the indicated program that exceeds a current version of the installed program in the computer. At least one recent patch 30 is downloaded (at block 254) from the server for at least one version exceeding the current version. The query and downloading operations may be performed by the boot controller 6 upon receiving the event signal on the out-of-band update network 22. Alternatively, the boot controller 6 may call a process in the operating environment to query the update server 24. Yet further, the event signal may be received via the in-band primary network 14, so that an application program 9 executing in the runtime 12 environment following initialization may handle the query and other related operations.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, the boot controller 6 uses a separate boot adaptor 20 and update network 22 to access patches from the update sever 24 before loading the operating system 8 and other applications 9. In alternative embodiments, the boot controller 6 may load and execute the network adaptor driver 10 before loading the operating system 8 to access the update server 24 and new patches over the primary network 14. In such alternative embodiments, there may be no out-of-band network in addition to the primary in-band network through which the boot controller communicates.

The illustrated operations of FIGS. 2, 3, and 4 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method for executing a boot sequence in a computer, comprising:
   executing a first network adaptor driver to enable communication with a first network, wherein the first network adaptor diver enables communication with the server over the first network before loading an operating system;
   querying a server over the first network before loading the operating system to determine whether there is a patch to apply;
   receiving the patch from the server in response to the query;
   updating program files with contents of the patch;
   loading a second network adaptor driver enabling communication with a second network in response to updating the program files; and
   loading the operating system in response to updating the program files.

2. The method of claim 1, wherein the query requests information on patch versions for installed programs having program files, further comprising:
   receiving information from the server on current patch versions for the installed programs;
   determining whether versions of installed programs are less than the current patch versions for the installed programs at the server; and
   requesting from the server the current patch versions for installed programs whose version is less than the current patch versions.

3. The method of claim 2, wherein the query includes a request for installed programs of all patch versions greater than the installed program version.

4. The method of claim 1, wherein the boot sequence and the first network adaptor driver are executed by a boot controller, and wherein the second network driver and operating system are executed by a processor.

5. A boot controller coupled to a computer system in communication with a server over a first network, wherein the computer system is coupled to a storage device including an operating system and program files, wherein the boot controller is enabled to execute a boot sequence to perform:
   executing a first network adaptor driver to enable communication with the first network, wherein the first network adaptor driver enables communication with the server over the first network before loading the operating system;
   querying the server over the first network before loading the operating system to determine whether there is a patch to apply;
   receiving the patch from the server in response to the query;
   updating program files in the storage device with contents of the patch;
   loading a second network adaptor driver enabling communication with a second network in response to updating the program files; and
   loading the operating system in response to updating the program files.

6. The boot controller of claim 5, wherein the query requests information on patch versions for installed programs having program files in the storage device, wherein the boot controller is further enabled to execute the boot sequence to perform:
   receiving information from the server on current patch versions for the installed programs;
   determining whether versions of installed programs are less than the current patch versions for the installed programs at the server; and
   requesting from the server the current patch versions for installed programs whose version is less than the current patch versions.

7. The boot controller of claim 6, wherein the query includes a request for installed programs of all patch versions greater than the installed program version.

8. A system in communication with a server over a first network and in communication with a second network, comprising:
   a processor;
   a first network adaptor enabling communication with the first network;
   a second network adaptor enabling communication with the second network;
   a first network adaptor driver;
   a second network adaptor driver;
   a storage device;

an operating system stored in the storage device;
program files stored in the storage device; and
a boot controller enabled to execute a boot sequence to perform:
 executing the first network adaptor driver to enable communication with the first network;
 querying the server over the network via the first network adaptor before loading the operating system to determine whether there is a patch to apply;
 receiving the patch from the server in response to the query;
 updating program files in the storage device with contents of the patch;
 loading the second network adaptor driver enabling communication with the second network in response to updating the program files, wherein the second network adaptor driver is executed by the processor; and
 loading the operating system in response to updating the program files, wherein the processor executes the operating system in a runtime environment.

9. The system of claim 8, wherein the query requests information on patch versions for installed programs having program files in the storage device, wherein the boot controller is further enabled to execute the boot sequence to perform:
 receiving information from the server on current patch versions for the installed programs;
 determining whether versions of installed programs are less than the current patch versions for the installed programs at the server; and
 requesting from the server the current patch versions for installed programs whose version is less than the current patch versions.

10. An article of manufacture comprising at least one of a computer readable storage medium having code and a device including firmware executed within a computer system in communication with a server over a first network, wherein the computer system includes an operating system, program files, a first network adaptor driver, and a second network adaptor driver used to communicate with a second network, wherein the article of manufacture causes operations to be performed, the operations comprising:
 executing the first network adaptor driver to enable communication with the first network, wherein the first network adaptor driver enables communication with the server over the first network before loading the operating system;
 querying the server over the first network before loading the operating system to determine whether there is a patch to apply;
 receiving the patch from the server in response to the query;
 updating program files with contents of the patch;
 loading the second network adaptor driver enabling communication with the second network in response to updating the program files; and
 loading the operating system in response to updating the program files.

11. The article of manufacture of claim 10, wherein the query requests information on patch versions for installed programs comprising program files, wherein the operations further comprise:
 receiving information from the server on current patch versions for the installed programs;
 determining whether versions of installed programs are less than the current patch versions for the installed programs at the server; and
 requesting from the server the current patch versions for installed programs whose version is less than the current patch versions.

12. The article of manufacture of claim 11, wherein the query includes a request for installed programs of all patch versions greater than the installed program version.

13. The article of manufacture of claim 10, wherein the article of manufacture is implemented in a boot controller in the computer system.

14. The method of claim 1, wherein the patch comprises a version of at least one of operating system, application, and driver files installed in the computer and executed in a runtime environment of the computer.

15. The boot controller of claim 5, wherein the patch comprises a version of at least one of operating system, application, and driver files installed in the computer and executed in a runtime environment of the computer.

16. The system of claim 8, wherein the patch comprises a version of at least one of operating system, application, and driver files installed in the computer and executed in a runtime environment of the computer.

17. The article of manufacture of claim 10, wherein the patch comprises a version of at least one of operating system, application, and driver files installed in the computer and executed in a runtime environment of the computer.

* * * * *

UNITED STATES PATENT AND TRADEMARK OFFICE
CERTIFICATE OF CORRECTION

| | |
|---|---|
| PATENT NO. | : 7,506,149 B2 |
| APPLICATION NO. | : 10/927834 |
| DATED | : March 17, 2009 |
| INVENTOR(S) | : Rothman et al. |

It is certified that error appears in the above-identified patent and that said Letters Patent is hereby corrected as shown below:

In the Claims

Column 5, line 54, "adaptor diver enables" should read --adaptor driver enables--.

Signed and Sealed this
Eleventh Day of November, 2014

Michelle K. Lee
*Deputy Director of the United States Patent and Trademark Office*